United States Patent [19]

Bleck et al.

[11] Patent Number: 4,787,215

[45] Date of Patent: Nov. 29, 1988

[54] TRANSPORT REFRIGERATION APPARATUS

[75] Inventors: Gregory D. Bleck, Chaska; Michael R. Weiss, Richfield, both of Minn.

[73] Assignee: Thermo King Corporation, Minneapolis, Minn.

[21] Appl. No.: 163,353

[22] Filed: Mar. 2, 1988

[51] Int. Cl.$^4$ .............................................. B60H 1/32
[52] U.S. Cl. ...................................... 62/239; 62/263; 248/311.2
[58] Field of Search ...................... 62/239, 263, 323.1; 248/311.2

[56] References Cited

U.S. PATENT DOCUMENTS

| | | | |
|---|---|---|---|
| 2,263,476 | 11/1941 | Sunday | 62/239 X |
| 2,420,566 | 5/1947 | Scarratt | 62/323.1 |
| 3,220,711 | 11/1965 | Leppard et al. | 62/263 X |
| 3,502,294 | 3/1970 | Kallow et al. | 248/311.2 |
| 4,348,871 | 9/1982 | Androff | 62/239 |
| 4,551,986 | 11/1985 | Anderson et al. | 62/239 |
| 4,736,597 | 4/1988 | Anderson et al. | 62/239 |

Primary Examiner—William E. Tapolcai
Attorney, Agent, or Firm—D. R. Lackey

[57] ABSTRACT

Transport refrigeration apparatus including a metallic frame having first and second upstanding end portions, an upstanding back portion, and a horizontally oriented portion which extends between the upstanding end portions and the upstanding back portion. The metallic frame includes first and second spaced end members each having first and second integral portions. The first integral portions form part of the upstanding back portion, and the second integral portions form the first and second upstanding end portions. The second integral portions function as support arms for refrigeration components of the apparatus, with each having a generally triangular configuration which includes a horizontally oriented lower side, a vertically oriented back side, and a flanged side. The flanged side includes a horizontally oriented lower portion which flares upwardly via a smoothly radiused intermediate portion to join an upper portion which slopes towards the vertically oriented back side.

10 Claims, 4 Drawing Sheets

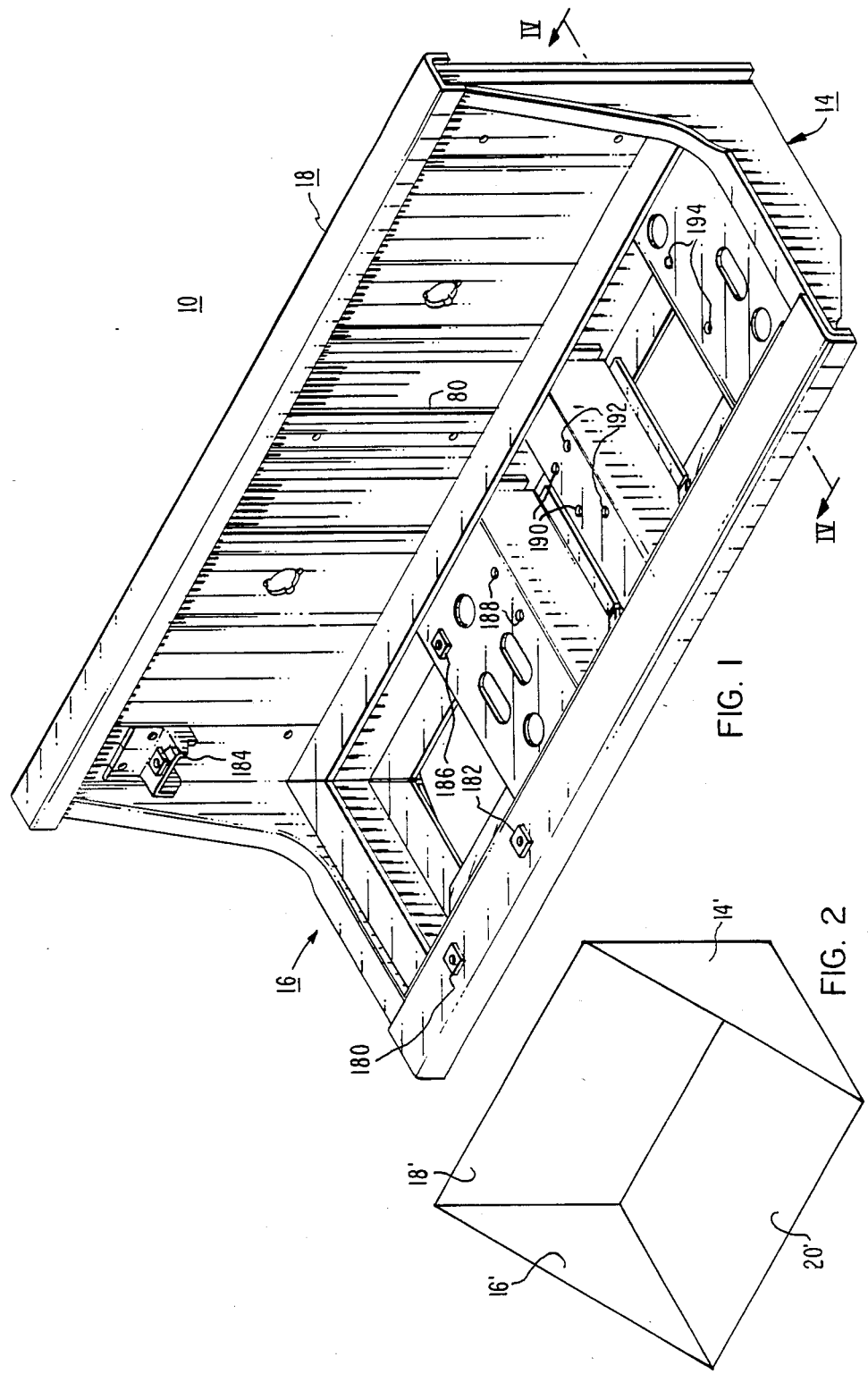

TRANSPORT REFRIGERATION APPARATUS

BACKGROUND OF THE INVENTION

1. Field of the Invention

The invention relates in general to transport refrigeration apparatus, and more specifically to one-piece, completely self contained refrigeration units suitable for straight trucks.

2. Description of the Prior Art

Transport refrigeration systems for straight trucks are often mounted through the front wall of the truck body. Tilt cab clearance is usually not a problem when the refrigerant compressor is in the truck engine compartment, and driven by the truck engine, as the refrigeration package mounted on the truck wall can easily be made small and compact. When a Diesel engine and compressor are added to the refrigeration package to make a self contained unit, however, it presents a challenge in coordinating and mounting the various refrigeration components on a frame to provide the requisite mechanical strength without creating size and weight problems.

It is the object of the present invention to reduce the weight of a one-piece, self contained refrigeration unit for straight trucks, without deleteriously affecting the mechanical strength of the unit, as well as to provide an arrangement which permits a condenser to be located such that the need to increase truck body height to accomodate tilt cab clearance is reduced or eliminated.

SUMMARY OF THE INVENTION

Briefly, the present invention is directed to one-piece, self contained transport refrigeration apparatus for straight trucks. The transport refrigeration apparatus of the invention includes a metallic frame constructed primarily of aluminum. Easy access to refrigeration components mounted on the frame for maintenance, easy assembly of the components on the frame during manufacturing, and a component arrangement which permits desirable condenser location, are all provided by a cantilevered skeletal frame structure which elminates prior art frame elements without sacrificing mechanical strength and integrity. The cantilevered frame provides a completely open space at the upper front of the unit which enables the condenser to be elevated above the mounting level of the frame, for maximum tilt cab clearance.

More specifically, the metallic frame includes first and second upstanding end portions, an upstanding back portion, and a horizontally oriented portion which extends between the upstanding back and end portions. First and second spaced end members, and front, rear and top channels form a hollow-like structure which supports a plurality of spaced component support channels which extend between the front and rear channels.

The first and second spaced end portions each include first and second integral portions. The first integral portions form part of the upstanding back portion of the frame, and the second integral portions form the first and second upstanding end portions. The rear channel is disposed to structurally relate the first integral portions. The front channel, which is in spaced, parallel relation with the rear channel, extends between the mechanically joins the second integral portions.

The second integral portions function as support arms for refrigeration components mounted on and between the spaced component support members. Exceptional mechanical strength is provided by the support arms, while eliminating frame components and weld joints, by forming the second integral portions in a generally triangular configuration. The triangular configuration includes a generally horizontally oriented lower side, a vertically oriented back side which joins the first integral portion, and a flanged side. The flanged side includes a horizontally oriented lower portion which flares upwardly via a smoothly radiused intermediate portion to join an upper portion which slopes towards the vertically oriented back side of the triangular configuration.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 1 is a perspective view of a frame for transport refrigeration apparatus constructed according to the teachings of the invention;

FIG. 2 is a perspective view of structural planes defined by the frame shown in FIG. 1;

DESCRIPTION OF PREFERRED EMBODIMENTS

Figure 4:
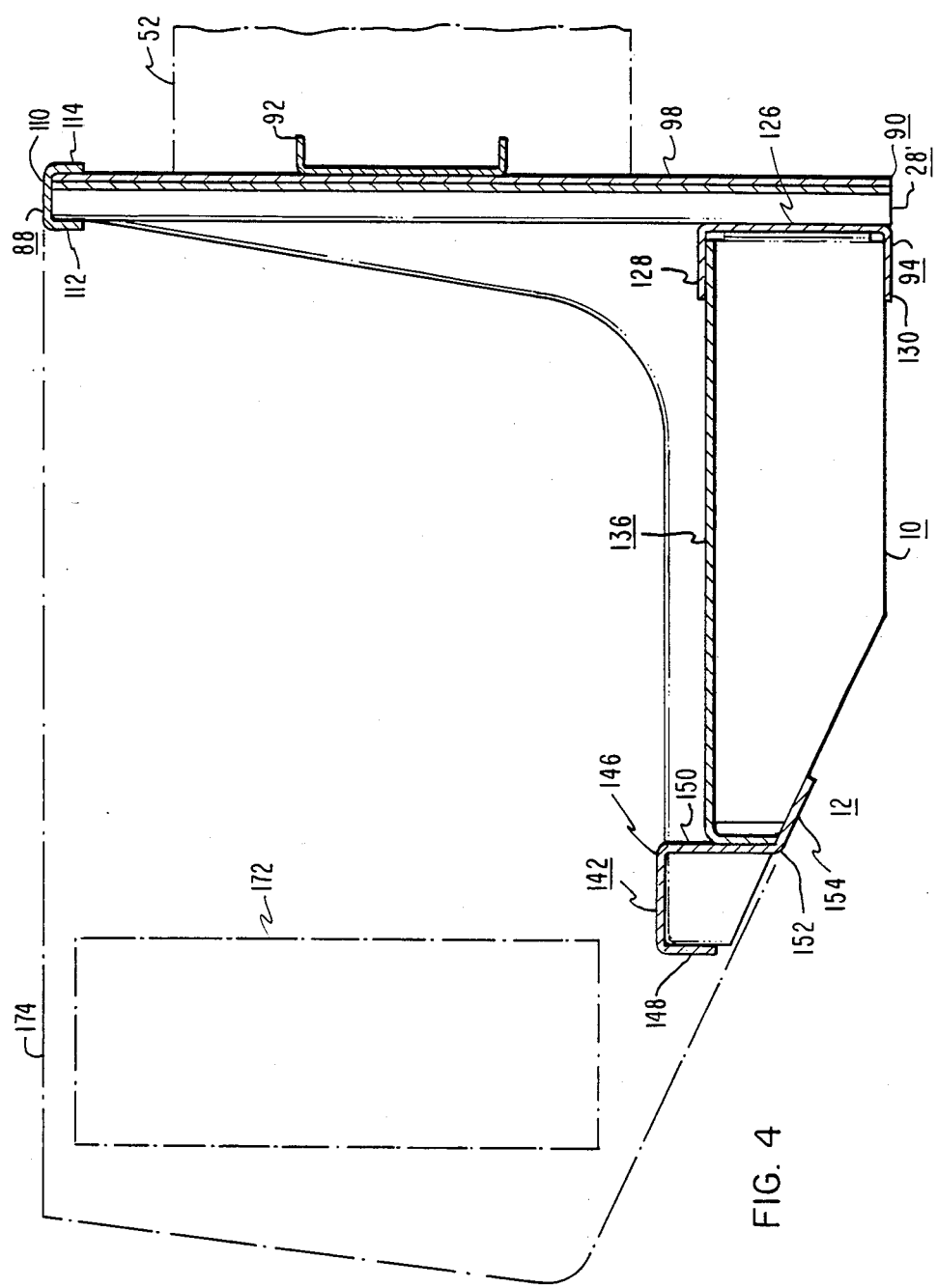
FIG. 4 is a cross sectional view of the frame shown in FIG. 1, taken between and in the direction of arrows IV—IV in FIG. 1, with an outer cover, a refrigerant evaporator and a condenser being shown in phantom.
Figure 5:
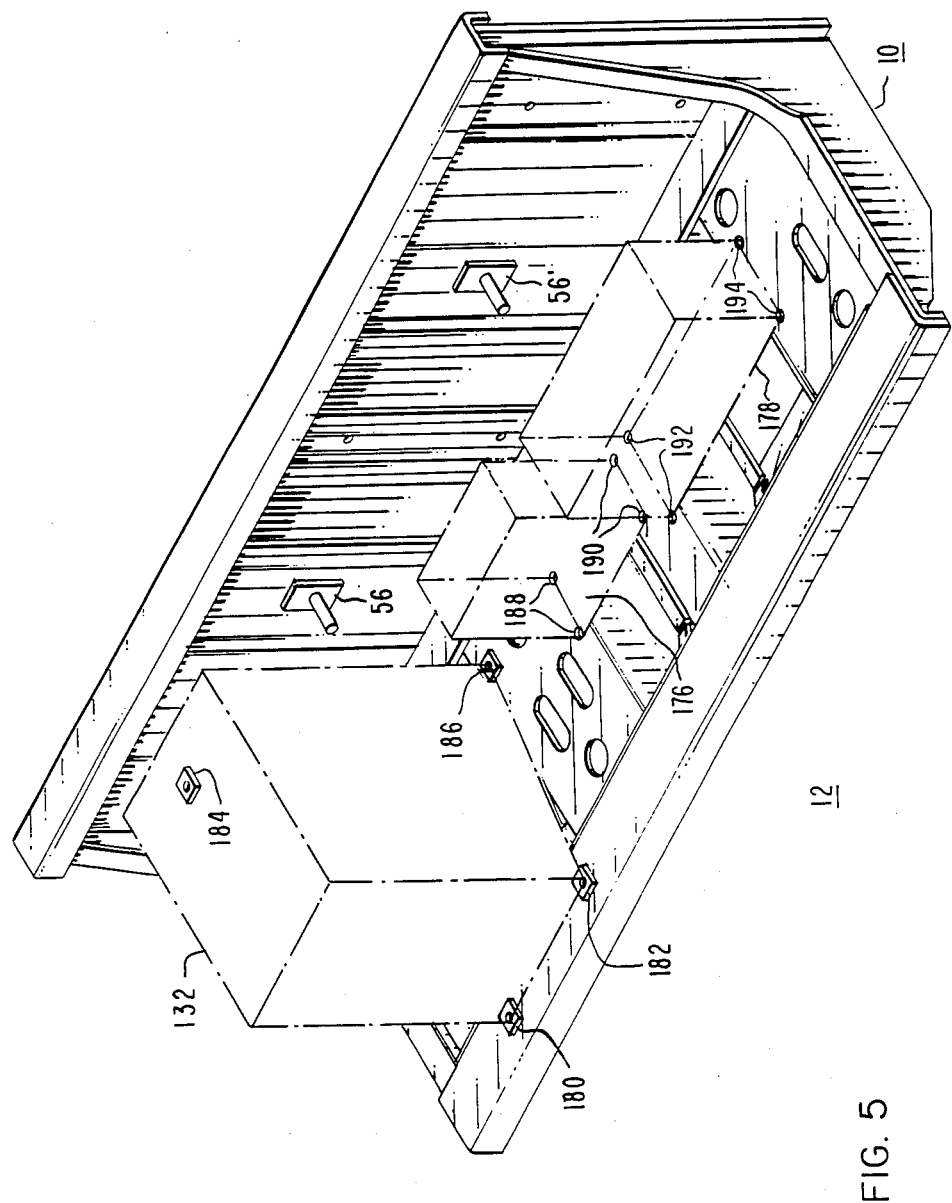
FIG. 5 is a perspective view of the frame shown in FIG. 1, illustrating how major refrigeration components are mounted on the "ladder" type skeletal structure of the frame.

Referring now to the drawings, and to FIG. 1 in particular, there is shown a metallic frame 10 for transport refrigeration apparatus 12, with apparatus 12 being shown in FIGS. 4 and 5. Frame 10 will first be described, and then the combination of frame 10 with various refrigeration system components to form transport refrigeration apparatus 12 will be described.

In general, frame 10 is essentially formed of aluminum, with stainless steel being used at strategic points, such as for backing up lifting points, engine mounting pads, and the like. Frame 10 includes first and second upstanding end portions 14 and 16, respectively, an upstanding back portion 18, and a horizontally oriented portion 20.

As shown in FIG. 2, the first and second upstanding end portions 14 and 16 define first and second parallel end planes 14' and 16', respectively, the vertical back portion 18 defines a vertical back plane 18' which extends between the side planes, and the horizontally oriented portion defines a horizontal refrigeration component support plane 20' which extends between the side and back planes.

Figure 3:
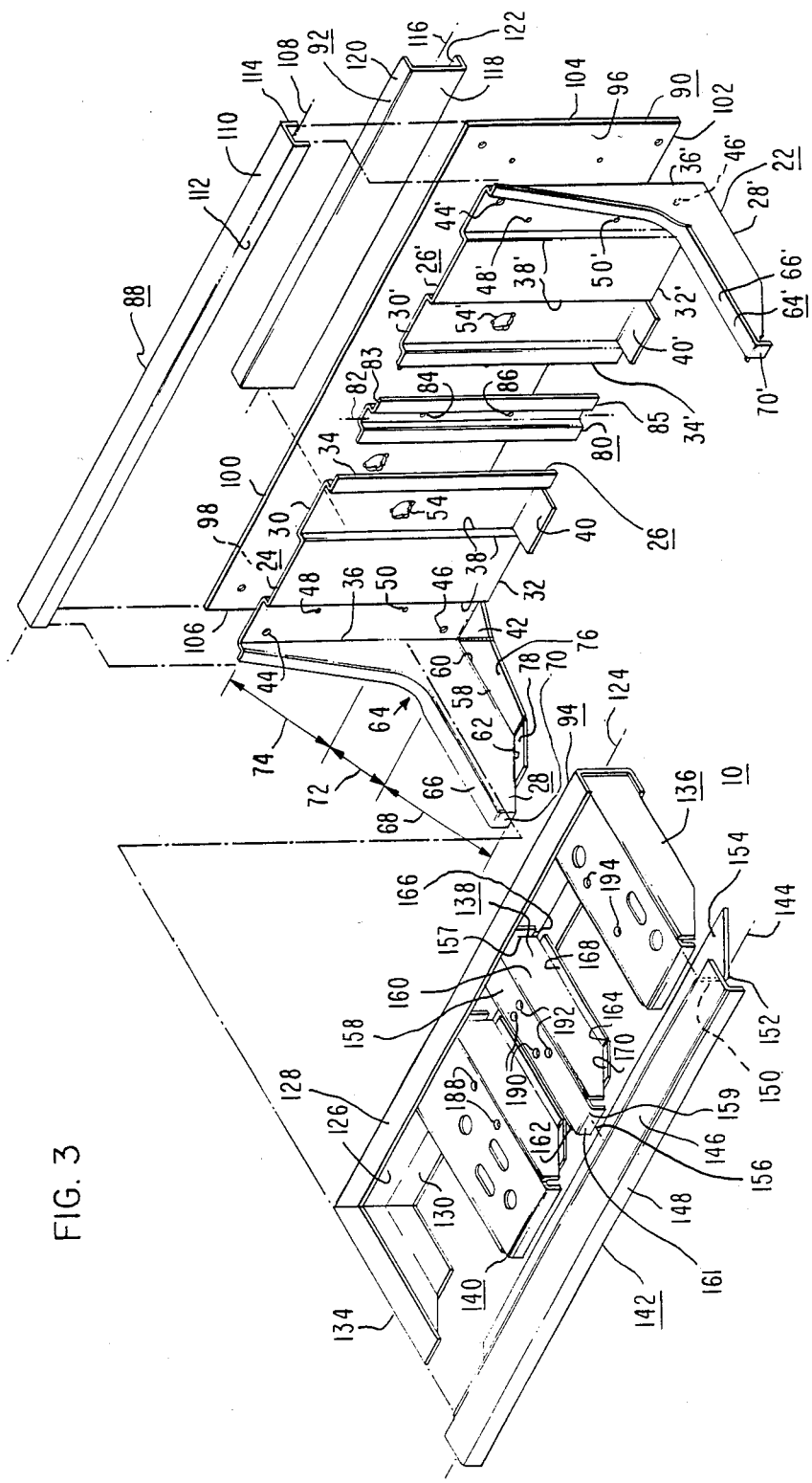
FIG. 3 is an exploded perspective view of the frame shown in FIG. 1.

For the following more detailed description of frame 10, FIG. 3 will be referred to, with FIG. 3 being an exploded perspective view of frame 10. Frame 10 includes first and second end members 22 and 24, respectively, which are similar in construction except for being "right hand" and "left hand" counterparts. End member 24 will be described in detail, with end member 22 being reference with the same reference numerals except for the addition of a prime mark.

End member 24 is formed from a sheet of aluminum, and it includes first and second integral, orthogonally related portions 26 and 28, respectively. The first integral portion 26 defines a substantially rectangular configuration which includes upper and lower edges 30 and 32, respectively, and first and second lateral edges 34 and 36, respectively. The first lateral edge 34 is a free edge while the second lateral edge 36 is formed by a right angle bend, and is thus is common with an edge of the second integral portion 28. The first integral portion 26 is "corrugated" by a plurality of vertically extending, horizontally spaced bends 38 to increase the effective thickness of the aluminum sheet, which increases the rigidity and strength of the first integral portion 26. The bottom edge 32 includes inwardly extending integral flanges 40 and 42. Openings 44 and 46 are provided for receiving thru-bolts (not shown) which mount refrigeration apparatus 12 to the front wall of a straight truck, and openings 48 and 50 are provided for mounting a refrigerant evaporator 52 (FIG. 4) to the upstanding back portion 18 of frame 10. An opening 54 receives a bearing housing and shaft assembly 56 (FIG. 5) for supporting an evaporator fan (not shown).

The second integral portion 28 defines a generally triangular configuration, as indicated by the first and second end planes 14' and 16' in FIG. 2. The triangular configuration includes a generally horizontally oriented lower side 58. The word "generally" is used because the lower side 58 includes two portions, a first portion 60 which is horizontal, and a second portion 62 which slopes upwardly from the horizontal for providing tilt cab clearance. The triangular configuration further includes a vertically oriented side which is referenced 36 as it is in common with side 36 of the first integral portion 26. The third or remaining side of the triangular configuration, referenced 64, is flanged its entire length, such as by die extrusion, to form a high strength cantilevered support arm which transmits weight from the support plane 20' to the truck wall mounting plane 18' without setting up stress concentration points.

More specifically, flanged side 64 includes an outwardly extending flange 66, with "outwardly" referring to a direction away from the internal structure of frame 10. Flanged side 64 includes three sections or portions which flow smoothly together, including a first section 68. The first section 68 is horizontally oriented except for a downwardly turned end portion 70. The first section 68 flares smoothly upwardly via a radiused intermediate portion 72, to join an upper, substantially straight portion 74 which slopes towards the vertically oriented common side 36.

The lower side 58 of the triangular configuration includes inwardly projecting flange portions 76 and 78, for added strength and rigidity. Flanges 76 and 42 are welded along the corner seam to provide gussets which minimize side racking of the frame.

The first integral portions 26 and 26' of end members 24 and 22, respectively, are aligned with their free ends 34 and 34' facing one another in spaced relation, to form part of the upstanding back portion 18.

An aluminum support channel 80, having a vertically oriented longitudinal axis 82 and upper and lower ends 83 and 85, respectively, is disposed intermediate ends 34 and 34'. Channel 80 provides additional support for evaporator 52 via openings 84 and 86 for receiving additional evaporator mounting bolts.

Additional support and mechanical strength for the upstanding back portion 18 is provided by an aluminum top channel member 88, an aluminum sheet member 90, an aluminum reinforcing channel 92, and an aluminum rear channel member 94.

Metallic sheet member 90, which is rectangular in configuration, has inner and outer flat major surfaces or sides 96 and 98, respectively, upper and lower edges 100 and 102, respectively, and first and second ends 104 and 106, respectively. Sheet member 90 is disposed against the first integral portions 26 and 26', and against intermediate channel member 80, with its upper edge 100 horizontally aligned with the upper edges 30 and 30' of the first intermediate portions 26 and 26', respectively, and with upper end 83 of channel member 80.

Top channel member 88, which has a longitudinal axis 108, includes a bight 110 and legs 112 and 114. Top channel member 88 is disposed and dimensioned to straddle or sandwich the upper ends or edges 30, 30', 83 and 100 of the first integral portions 26 and 26', the intermediate channel member 80, and the metallic sheet member 90, respectively. Thus, bight 110 is horizontally oriented and legs 112 and 114 become inner and outer depending legs, respectively.

Reinforcing channel member 92 has a longitudinal axis 116, a bight 118, and legs 120 and 122. Channel member 92 has its bight 118 disposed against and fixed to the outer surface 98 of sheet member 90, with axis 116 horizontally oriented, to add additional stiffness to the back wall portion 18 of frame 10.

Rear channel member 94 has a longitudinal axis 124, a bight 126, and legs 128 and 130. To provide additional strength and rigidity to the end of frame 10 on which a Diesel engine 132 (FIG. 5) is mounted, rear channel member 94 includes an integral support member 134 which is orthogonally related to the main body portion. Rear channel member 94 is disposed to add additional strength to the upstanding back portion 18 of frame 10, and to provide a support for one end of each of a plurality of spaced aluminum support members 136, 138, and 140. As will be hereinafter explained, members 136, 138 and 140 extend into the channel opening of rear channel member 94, with the lower leg 130 functioning as the first of two support points, or one side of a ladder-like structure in which support members 136, 138 and 140 are rungs.

An aluminum front channel member 142 structurally relates the outwardly extending ends of the support arms provided by the second integral portions 28 and 28' of the first and second end members 22 and 22', respectively, as well as providing the second support point for the support members 136, 138 and 140. More specifically, front channel member 142 includes a longitudinal axis 144, a bight 146 and legs 148 and 150. Channel member 142 has a length dimensioned such that bight 146, which is horizontally oriented, extends over the outwardly extending flanges 66 and 66' of the flanged sides 64 and 64' of the second integral portions 28 and 28', with leg 148 being an outer depending leg which is closely adjacent to the downwardly turned flanged ends 70 and 70'.

The inner depending leg 150 includes an obtuse bend 152 which creates an inwardy extending flange 154 which functions as the additional support for the plurality of spaced component support members 136, 138 and 140.

The plurality of spaced component support members 136, 138 and 140 are structurally similar, but have different width dimensions depending upon the refrigeration components they are to provide support for. For example, support member 138 is channel shaped, having a longitudinal axis 156, first and second axial ends 157 and 159, a horizontally oriented bight 158, and legs 160 and 162. Legs 160 and 162 start with a maximum length dimension at the first end 157 which is selected to snugly fit the channel opening of rear channel member 94. The legs then start tapering upwardly at point 164 to a smaller dimension, along an angle from the horizontal which provides increased tilt cab clearance for refrigeration apparatus 12. Bight 158 is bend downwardly at end 159 to box in the channel opening with downward flap 161, resulting in increased mechanical strength as well as a support surface which rests upon flange 154.

The first end 157 may be flanged, such as a flange 166, to provide additional strength and an easier weld joint. The legs 160 and 162 may also be flanged for added strength, such as flanges 168 and 170 at the bottom of leg 160. The bights of the spaced support members 136, 138 and 140 contain openings for mounting refrigeration components, as will be hereinafter described.

When the frame parts shown exploded in FIG. 3 are assembled as shown in FIG. 1, they are suitably welded into a compact, coherent unit. The open structure of frame 10 lends itself to robotic welding, if desired.

The cross sectional view of refrigeration apparatus 12 shown in FIG. 4 indicates how the cantilevered configuration of frame 10 provides ample space at the front of the apparatus, above the horizontally oriented frame mounting plane 20', for mounting a refrigerant condenser 172. Broken outline 174 indicates a cover for apparatus 12, which may be plastic, or metal, as desired.

As shown in FIG. 5, refrigeration apparatus 12, in addition to engine 132, includes a refrigerant compressor 176, and a motor 178 for driving a condenser fan (not shown). Stainless steel engine mounting pads 180, 182, 184 and 186 are provided for mounting engine 132. Pads 180 and 182 are on the bight 146 of front channel member 142. Pad 184 is on an upper engine mounting bracket 185 which is fixed to upstanding portion 26 of end member 24. Pad 186 is on support member 140. It will be noted that frame 10 is completely open below engine 132, allowing for increased oil sump capacity.

Adjacent support members 140 and 138 include openings for mounting compressor 176, which is driven by engine 132, such as openings 188 in member 140 and openings 190 in member 138. Again, compressor 176 straddles the two adjacent support members 138 and 140, eliminating the need for frame structure below the compressor.

Adjacent support members 138 and 136 include openings 192 and 194, respectively, for mounting a condenser fan motor pedestal 178 upon which a condenser fan and motor assembly (not shown) is mounted. The condenser fan motor is also driven by engine 132. Similar to the other major refrigeration components, motor pedestal 178 straddles the two adjacent support members 136 and 138.

The remaining refrigeration components and electrical control box are mounted on the plurality of spaced support members 136, 138 and 140.

In summary, there has been disclosed new and improved transport refrigeration apparatus 12, including a frame 10 which has fewer frame support elements, compared with similar sized prior art units. The weight of the ladder-like frame structure is less than like-sized prior art frames, but the requisite mechanical strength has been maintained by the cantilevered, smoothly curved, flanged support arms defined by the second integral portions 28 and 28' of the first and second end members 22 and 24, respectively. For example, frame 10 weights 170 pounds less than a prior art unit of similar capacity with which we are familar, and frame 10 has 18 fewer frame parts than the prior art unit. The flanged cantilevered sides, which are formed by die extrusion, transmit vertical support forces created by the weight of the refrigeration components through the flanged sides back to the unit mounting bolts. The smooth extrusion of the flange provides uniform load transmittal, eliminating the need for multiple welded lap joints which create high stress points or areas. The incorporation of these flanged support arms to the frame ends provides structurally sound bases for the front and rear channel members 142 and 94. These channel members establish the spacing or frame length to which the intermediate support members or stringers 136, 138 and 140 are attached. In addition to reducing the weight of the component support frame 10, the openness created by the disclosed structural arrangement of frame 10 improves access to, and installation of, the various mechanical and electrical components of refrigeration apparatus 12, from either side or the front of frame 10. The openness, simplicity, and reduced number of frame components aid in reduced labor for piece part manufacture and assembly weld time.

We claim as our invention:

1. Transport refrigeration apparatus, comprising:
   a metallic frame,
   said metallic frame including first and second upstanding end portions which define first and second spaced, parallel end planes, an upstanding back portion which defines a vertical back plane which extends between the first and second side planes, and a horizontally oriented portion which defines a horizontal support plane which extends between the side and back planes,
   said metallic frame having first and second spaced end members,
   each of said first and second spaced end members having first and second integral, orthogonally related portions, with the first integral portion defining a rectangular configuration which is part of the upstanding back portion of said metallic frame, and with the second integral portion defining a generally triangular configuration which is part of an end portion of said metallic frame,
   said triangular configuration including a horizontally oriented lower side, a vertically oriented side which joins the first integral portion, and a flanged side which extends between the horizontally and vertically oriented sides,
   said flanged side including a horizontally oriented lower portion which flares upwardly via a smoothly radiused intermediate portion to join an upper portion which slopes towards the vertically oriented side of the triangular configuration.

2. The transport refrigeration apparatus of claim 1 including:
   a rear channel member disposed along the upstanding back portion of the metallic frame to interconnect the first integral portions of the first and second end members,
   and a front channel member disposed in spaced parallel relation with said rear channel member, said front channel member interconnecting the second integral portions of the first and second end members.

3. The transport refrigeration apparatus of claim 2 wherein the rear channel member has first and second ends, a longitudinal axis which extends between said ends, and an integral support member transverse to the longitudinal axis which extends from at least one of said ends along a second integral portion of one of the first and second end members.

4. The transport refrigeration apparatus of claim 2 wherein the first and second integral portions of the first and second end members include inwardly projecting flange portions disposed to support the rear channel member.

5. The transport refrigeration apparatus of claim 2 including:
   a plurality of spaced support members fixed in spaced parallel relation between the front and rear channel members,
   and a plurality of refrigeration components mounted on and extending between said spaced support members.

6. The transport refrigeration apparatus of claim 5 wherein the front channel member has a horizontally oriented bight and inner and outer depending legs, with said inner leg including a bend to provide a first support flange, and wherein the rear channel member includes a vertically oriented bight and upper and lower legs, with said lower leg providing a second support flange, and wherein the plurality of spaced support members are supported by said first and second support flanges.

7. The transport refrigeration apparatus of claim 1 wherein the first integral portions of the first and second end members each have an upper edge, and including:
   a metallic sheet member having inner and outer surfaces, and an upper edge,
   the inner surface of said metallic sheet member being disposed against the first integral portions of the first and second end members,
   the upper edge of said metallic sheet member being disposed immediately adjacent to said upper edges of the first integral portions,
   and a top channel having a horizontally oriented bight and inner and outer depending legs which sandwich said upper edges of the first integral portions and said metallic sheet member.

8. The transport refrigeration apparatus of claim 7 wherein the first integral portions of the first and second end members are corrugated, including a plurality of vertically extending bends which increase the effective thickness dimension of the first integral portions, and wherein the bight of the top channel is dimensioned to accomodate the effective thickness dimension of the first integral portions.

9. The transport refrigeration apparatus of claim 7 including a reinforcing channel having a vertically oriented bight disposed against the outer surface of the metallic sheet member.

10. The transport refrigeration apparatus of claim 1 including:
   a vertically oriented, elongated intermediate channel member disposed between and spaced from the first integral portions of the first and second end members,
   and a refrigerant evaporator fixed to the first integral portions of the first and second end members and to said intermediate channel member.

* * * * *